United States Patent
Ellestad et al.

(10) Patent No.: US 6,658,466 B1
(45) Date of Patent: Dec. 2, 2003

(54) METHOD AND APPARATUS FOR INTEGRATING REMOTE HUMAN INTERACTIVE ASSISTANCE FUNCTION INTO SOFTWARE SYSTEMS

(75) Inventors: Michael D. Ellestad, Brooklyn Park, MN (US); Robert A. Hayes, Lexington, SC (US)

(73) Assignee: NCR Corporation, Dayton, OH (US)

(*) Notice: Subject to any disclaimer, the term of this patent is extended or adjusted under 35 U.S.C. 154(b) by 1030 days.

(21) Appl. No.: 08/729,362

(22) Filed: Oct. 16, 1996

(51) Int. Cl.[7] .......................... G06F 15/16; G06F 17/40
(52) U.S. Cl. ........................ 709/224; 345/708; 717/127
(58) Field of Search ................. 395/200.53, 200.54, 395/200.47, 200.43, 200.57, 200.41; 345/336, 338, 705, 708, 714; 709/224, 227, 288; 717/127, 131

(56) References Cited

U.S. PATENT DOCUMENTS

| | | | | |
|---|---|---|---|---|
| 4,356,545 A | * | 10/1982 | West | 364/200 |
| 5,193,185 A | * | 3/1993 | Lanter | 395/600 |
| 5,267,865 A | | 12/1993 | Lee et al. | 434/350 |
| 5,303,042 A | | 4/1994 | Lewis et al. | 348/14 |
| 5,341,412 A | | 8/1994 | Ramot et al. | 379/92 |
| 5,388,252 A | * | 2/1995 | Dreste et al. | 395/575 |
| 5,433,614 A | | 7/1995 | Beye | 434/307 R |
| 5,448,286 A | | 9/1995 | Decaesteke et al. | 348/17 |
| 5,448,739 A | * | 9/1995 | Jacobson | 709/320 |
| 5,458,494 A | | 10/1995 | Krohn et al. | 434/336 |
| 5,539,886 A | * | 7/1996 | Aldred et al. | 395/200.04 |
| 5,563,805 A | * | 10/1996 | Arbuckle et al. | 364/514 |
| 5,577,254 A | * | 11/1996 | Gilbert | 707/104.1 |
| 5,581,684 A | * | 12/1996 | Dudzik et al. | 395/338 |
| 5,687,096 A | * | 11/1997 | Lappan et al. | 364/514 |
| 5,712,978 A | * | 1/1998 | Lerner et al. | 395/200.11 |
| 5,884,032 A | * | 3/1999 | Bateman et al. | 395/200.34 |

FOREIGN PATENT DOCUMENTS

EP           279558 A  *  8/1988

* cited by examiner

*Primary Examiner*—Dung C. Dinh
(74) *Attorney, Agent, or Firm*—Ying Tuo; Maginot, Addison & Moore

(57) ABSTRACT

A method and an apparatus provide an application program user with remote interactive assistance from an application program expert. During running the application program, an information collection routine collects the information needed by the application program expert for the remote interactive assistance. In response to an assistance request, a call routine dials an application program expert based on the name of the application program, an information transfer routine transmits the collected information to the application program expert, and a display routine displays the collected information to the application program expert. The application program expert provides remote interactive assistance to the user based on the collected information.

20 Claims, 5 Drawing Sheets

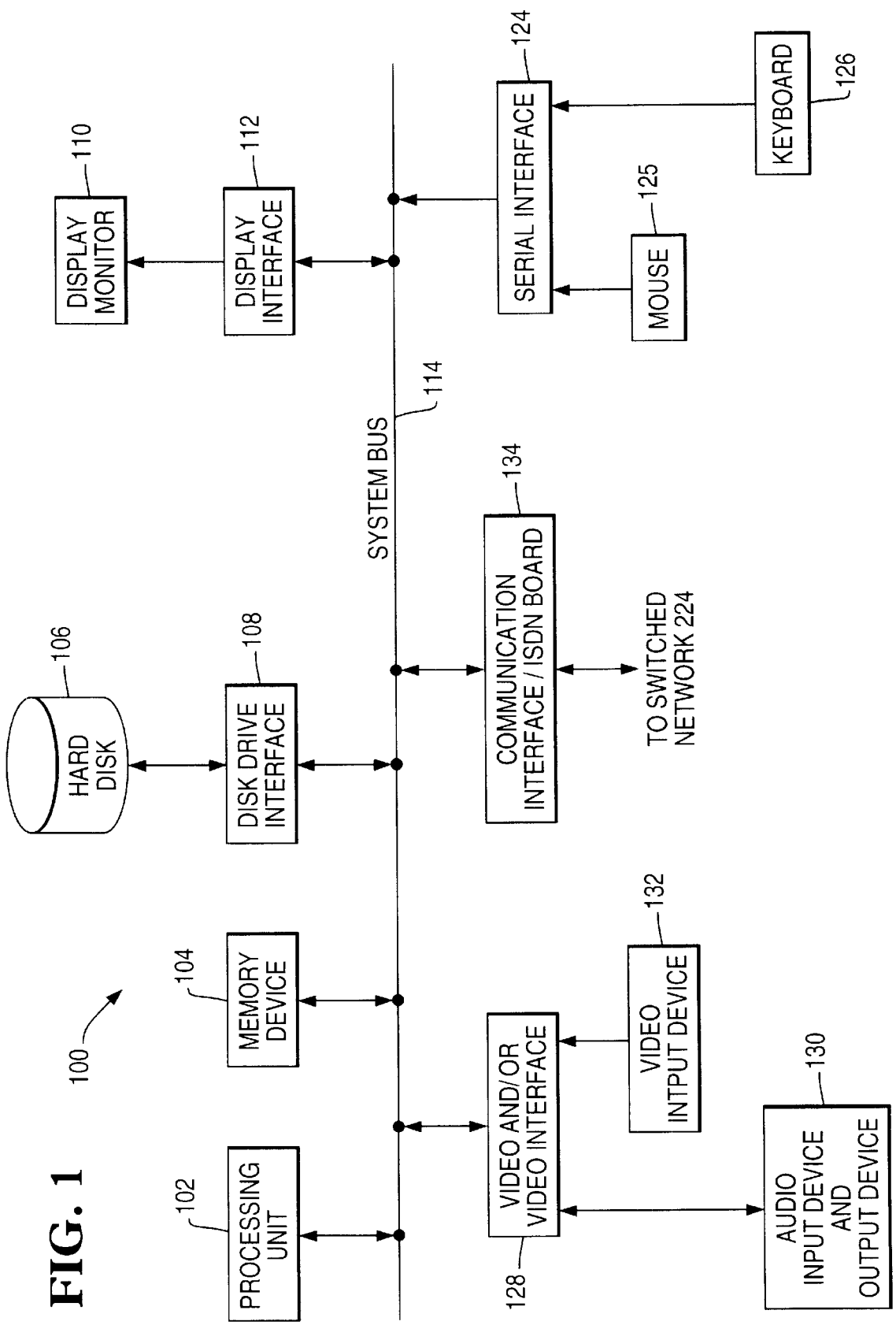

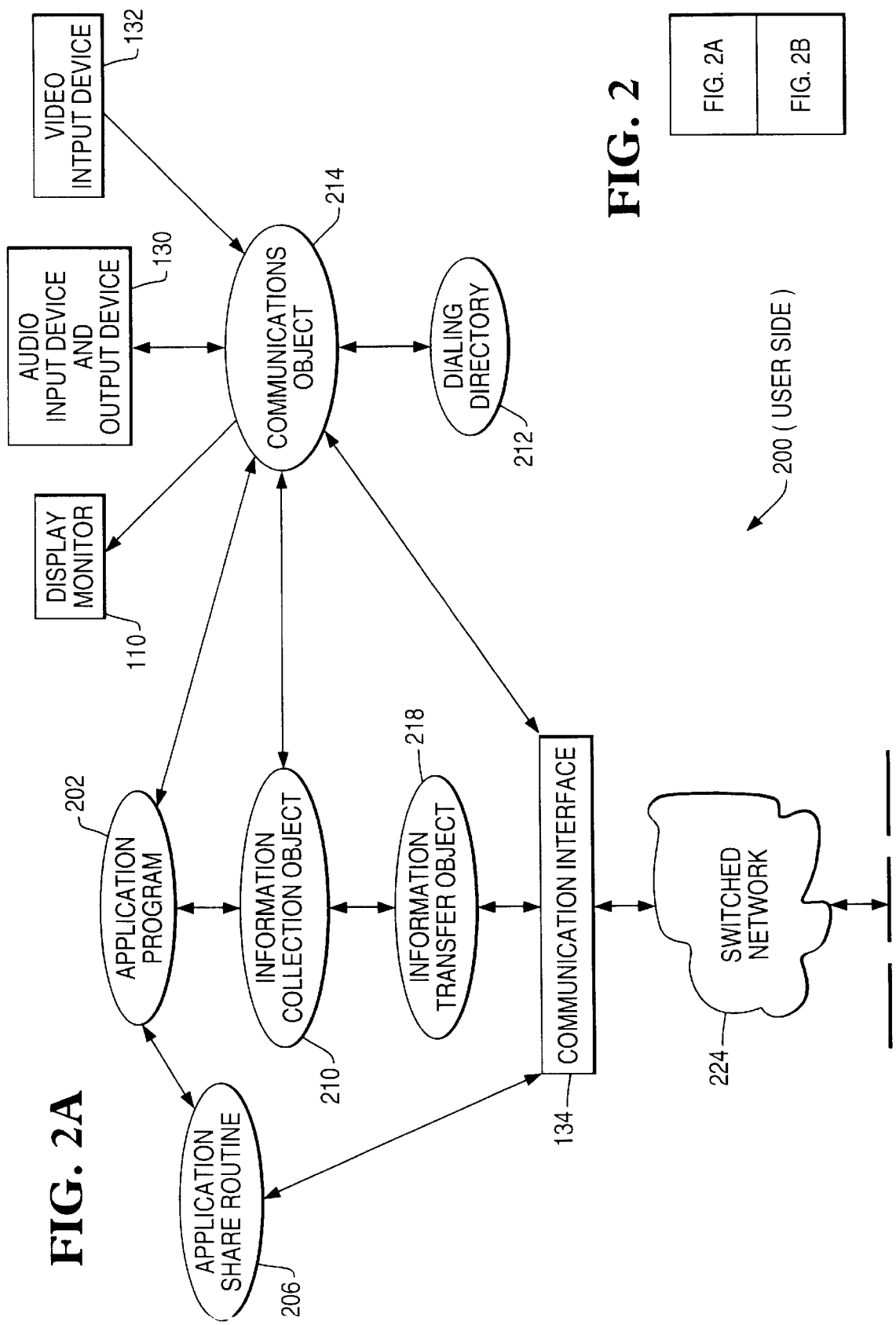

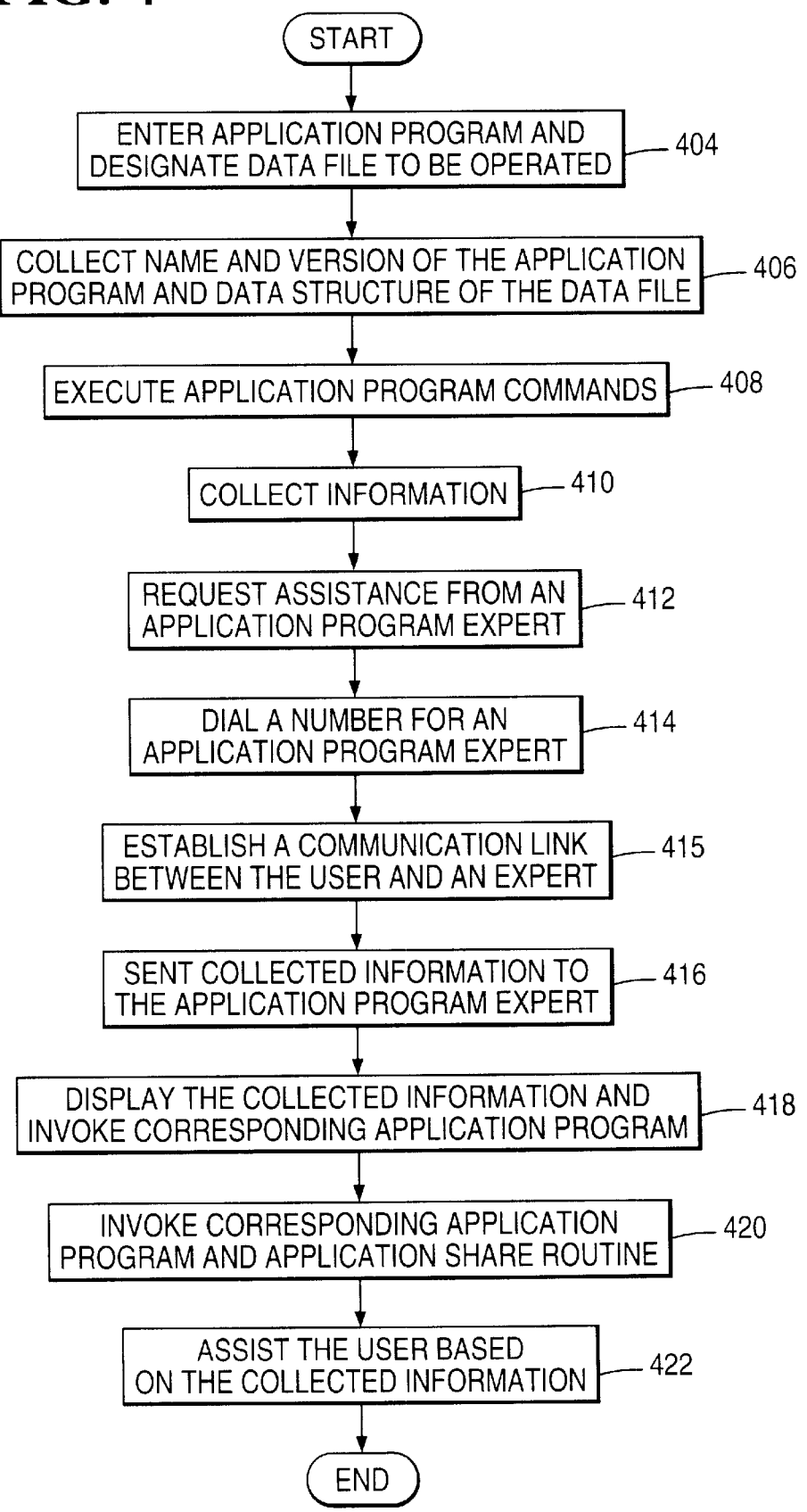

METHOD AND APPARATUS FOR INTEGRATING REMOTE HUMAN INTERACTIVE ASSISTANCE FUNCTION INTO SOFTWARE SYSTEMS

BACKGROUND OF THE INVENTION

The present invention relates generally to method and apparatus for providing remote human interactive assistance for software systems, particularly to method and apparatus for providing human interactive assistance for application programs.

Although help systems on application programs have been improved, they still cannot anticipate all situations and problems. Therefore, human interactive assistances are sometimes needed to answer questions or solve problems for users. Conventionally, due to limitations on human resource and service cost, software companies have been providing experts via remote communication (such as telephone communication) to assist a large number of users who are located in different geographic locations in using application programs. Typical application programs that are currently available to users include word processing program, spreadsheet, database program, time schedule program, financial management program, accounting program, graphic drawing program, business critical software, etc. It can be predicted that more and more new types of application programs will be commercially available to the users in near future.

Unfortunately, it is becoming more and more difficult and less and less feasible to use the conventional approach to assist users in using application programs via remote communication. This is so because of fast developments in computer hardware and software technology. With increasing processing power of computer hardware, application programs become more complex and complicated to use. A particular application program may have many commands, and the user's manual for the particular application program may be hundreds of pages long. Thus, it is not uncommon that, even though a user regularly uses basic commands of a particular application program, he/she does not have the knowledge as how to use some advanced commands of the particular application program. It is also not uncommon that, even though a user uses a command of a particular application program, he/she does not grasp all subtle aspects of the command.

In a working environment, one reality makes it even more difficult for an expert to answer questions or solve problems for a user via remote communication. That is, by the time a user is requesting assistance from an application program expert, the user may have executed many application program commands that have either changed one or more existing data items in a data file (or changed the data structure of a data file), or created new data item in a data file. (In database program, a data item can be a record consisting of several fields; in spreadsheet program, a data item can be a record consisting of several cells; in word processing program, a data item can be a page of a document; etc.). There may be a situation where the user finds that several previously executed commands have generated undesirable results. The user subsequently executes several more commands, attempting to correct the mistakes he/she previously made. Such an attempt may make the situation even worse. The user finally gives up and asks an expert for interactive assistance.

Under such a scenario, before answering questions or searching solutions, the conventional method requires an application program expert to collect information over telephone, such as: what is the version of the application software the user is operating on, what specific commands have been executed, what are the intended results the user wants to get, at what step the results were not desirable, etc. However, from a user who does not have a good command of the application software, it is very difficult and time consuming to collect accurate information via remote communication. Without such accurate information, application program experts will not be able to assist users effectively and efficiently.

Therefore, there exists a need for improved method and apparatus that can enable application program experts to remotely assist users effectively and efficiently.

The present invention meets this need.

SUMMARY OF THE INVENTION

In one aspect, the invention provides an improved method for providing assistance for an application program. The method comprises the steps of:

(a) running said application program by a user;

(b) collecting information;

(c) requesting assistance from a person; and (d) establishing communication link between said user and assistor in response to said request, so that said collected information can be sent to said person via said communication link.

In another aspect, the invention provides an apparatus for providing assistance for an application program. The apparatus comprises:

(a) means for running said application program by a user;

(b) means for collecting information;

(c) means for requesting assistance from a person; and (d) means for establishing communication link between said user and assistor in response to said request, so that said collected information can be sent to said person via said communication link.

These and other features and advantages of the present invention will become apparent from the following description and accompanying drawings.

BRIEF DESCRIPTION OF THE DRAWINGS

The purpose and advantages of the present invention will be apparent to those skilled in the art from the following detailed description in conjunction with the appended drawing, in which:

FIG. 1 shows a computer system that can be used by a user and an application program expert, in accordance with the present invention;

FIG. 4 is a flowchart illustrating steps of interactive assistance from an application program expert, in accordance with the present invention.

DETAILED DESCRIPTION OF THE PREFERRED EMBODIMENT

Figure 2B:
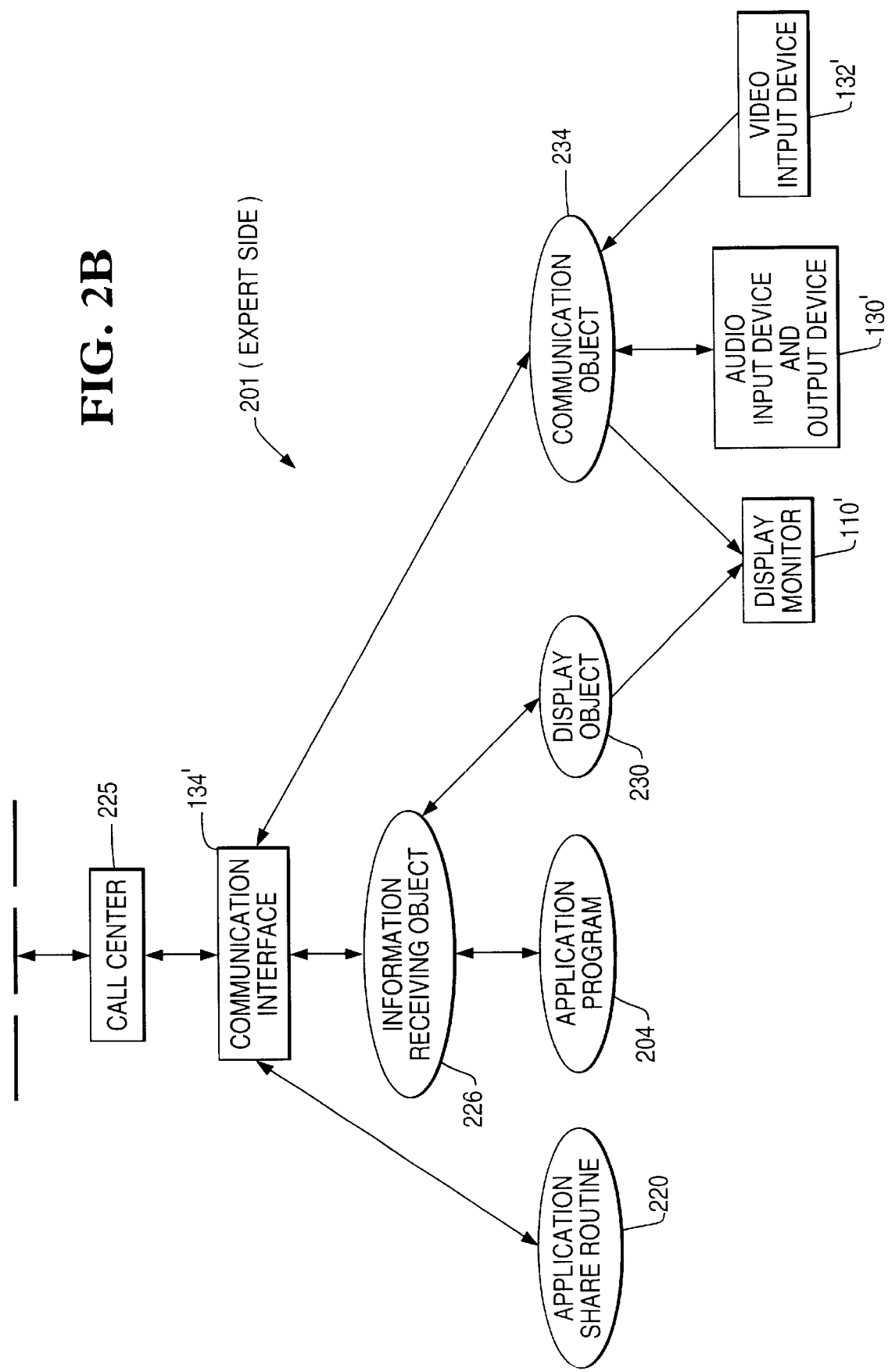
FIG. 2 (including 2A and 2B) is a block diagram of a remote interactive assistance system, in accordance with the present invention.

The following description is presented to enable any person skilled in the art to make and use the invention, and is provided in the context of a particular application and its requirements. Various modifications to the preferred embodiment will be readily apparent to those skilled in the art, and the principles defined herein may be applied to other embodiments and applications without departing from the spirit and scope of the invention. Thus, the present invention is not intended to be limited to the embodiment shown, but is to be accorded with the broadest scope consistent with the principles and features disclosed herein.

Referring now to FIG. 1, there is shown a computer system 100 that can be used by an application program user or an application program expert, in accordance with the present invention.

As shown in FIG. 1, the computer system comprises a processing unit 102, a memory device 104, a hard disk 106, a disk drive interface 108, a display monitor 110, a display interface 112, a serial interface 124, a mouse 125, a keyboard 126, a voice and/or video interface 128, audio input and output device 130, video input device (such as video camera) 132, a communication interface 134, and a system bus 114.

Hard disk 106 is coupled to disk drive interface 108; display monitor 110 is coupled to display interface 112; mouse 125 and keyboard 126 is coupled to serial interface 124; and audio input and out device 130 and video input device 132 are coupled to voice and/or video interface 128. Coupled to system bus 114 are: processing unit 102, memory device 104, disk drive interface 108, display interface 112, serial interface 124, voice and/or video interface 128, and communication interface 134.

Memory device 104 is able to store programs (including instructions and data). Operating together with disk drive interface 108, hard disk 106 is also able to store programs. However, memory device 104 has faster access speed than hard disk 106, while hard disk 106 has higher capacity than memory device 104.

Operating together with display interface 112, display monitor 110 is able to provide visual interface between programs being executed and a user.

Operating together with serial interface 124, mouse 125 and keyboard 125 are able to provide inputs to computer system 100.

Operating together with voice and/or video interface 128, voice input and output device 130 is able to generate and send and receive audio signals, and video input device 132 is able to generate and send video signals.

Communication interface 134 is able to initiate voice and/or video calls according to predetermined protocols. For example, to initiate voice calls, communication interface 134 is able generate dialing signals to a switched network. To initiate video calls, communication interface 134 is able to generate dialing and control signals according to video call protocols, such as ISDN (integrated services digital network) protocol. To communicate with computers connected to computer networks (local area networks and/or wide computer networks), communication interface 134 is able to convert data to be transmitted, and recover data received, in accordance with network protocols.

Processing unit 102 has access to memory device 104 and hard disk 106, and is able to control operations of computer system 100 by executing programs stored in memory device 104 or hard disk 106. Processing unit 102 is also able to control the transmissions of programs and data between memory device 104 and hard disk 106.

Referring now to FIG. 2 (including 2A and 2B), there is shown a block diagram of a remote interactive assistance system, including three hardware and six software function blocks at user side 200, and three hardware and five software function blocks at expert side 201, in accordance with the present invention.

In FIG. 2, software function blocks are delineated in oval circles, and hardware function blocks are delineated in rectangles. It should be noted that the computer system shown in FIG. 1 can be used in both user side and expert side. To differentiate a hardware function block at the user side from that at the expert side, in FIG. 2 an apostrophe is used together with a numerical label for the hardware function block at expert side.

As shown in FIG. 2A, user side 200 includes an application program 202 that is integrated with four routines, namely an application share routine 206, an information collection object 210, a communication object 214, and an information transfer object 218.

Application program 202 is able to perform certain operations over certain type of data. For example, a relational database program can perform operations on the data organized in records with each record containing a plurality of fields.

Application share routine 206 allows an application program expert to remotely control operation of a user's computer system on which application program 202 is running.

During the use of application program 202, information collection object 210 is able to dynamically collect information, which may be needed later by an application program expert. Once a user enters application program 202, information collection object 210 collects the name and version of application program 202. When the user designates a specific data file upon which application program 202 will be operating, information collection object 210 collects the name and data structure for the data file. During execution of the commands, information collection objects 210 records the executed commands and the execution sequence. In response to each command that is being executed, information collection object 210 collects changed data items (or newly created data items), if the execution of the command changes exiting data items (or creates new data items); and records the changes of the data structure if the execution of the command affects the data structure. The collected information can be stored in a buffer with a fixed size set by software developer. As new information is entered, the oldest information will be displaced. This allows application program experts to deal with a manageable information set and keeps memory overhead and data transmissions to a minimum. The content and format of the collected information is application program specific, that is they depend on the application program running on the user's computer system.

Information transfer object 218 is able to transmit the information collected by information collection object 210 to network 224 via communication interface 134, in accordance with a predetermined network protocols (such as local network protocols or wide network protocols).

Dialing directory 212 stores dialing numbers with each of the numbers associating with an application program.

Communication object 214 is able to monitor the use of application program 202. When communication object 214 detects that the user constantly makes mistakes, it will prompt on display monitor 110, asking whether the user needs to call an application expert for help. Upon receiving a request for help from a user, communication object 214 will get the name and version of application program 202 from information collection object 210, search a number from dialing directory 212 for application program 202, and dial the application program expert associated with the number communication interface 134. Communication object 214 is also able to transmit and receive voice and video signal via communication interface 134 during the interaction between a user and an application program expert.

As shown in FIG. 2B, expert side 201 includes an application program 204 that is integrated with four routines, namely information receiving object 226, application share routine 220, a display object 230 and a communication object 234.

Application program 204 at expert side is the same program as application program 202 at user side.

Information receiving object 226 is able to receive the information sent by information transfer object 218 via communication interface 134' and convert the information usable by application share routine 220, application program 204 and display object 230.

Operating together with application share routine 206 at user side, application share routine 220 at expert side allows an application program expert to remotely control operation of the computer system at user side on which application program 202 is running. Based upon the name and version of application program 202, information receiving object 226 is able to invoke application program 204 without any action from expert.

Display object 230 is able to display the information received by information receiving object 226 on display monitor 110'.

Communication object 234 is able to able to transmit and receive voice and video data via voice communication interface 134' during the interaction between a user and an application program expert.

The computer system at user side 200 can be connected to the computer system at expert side 201 through switched network 224 and call center 225.

Figure 3:
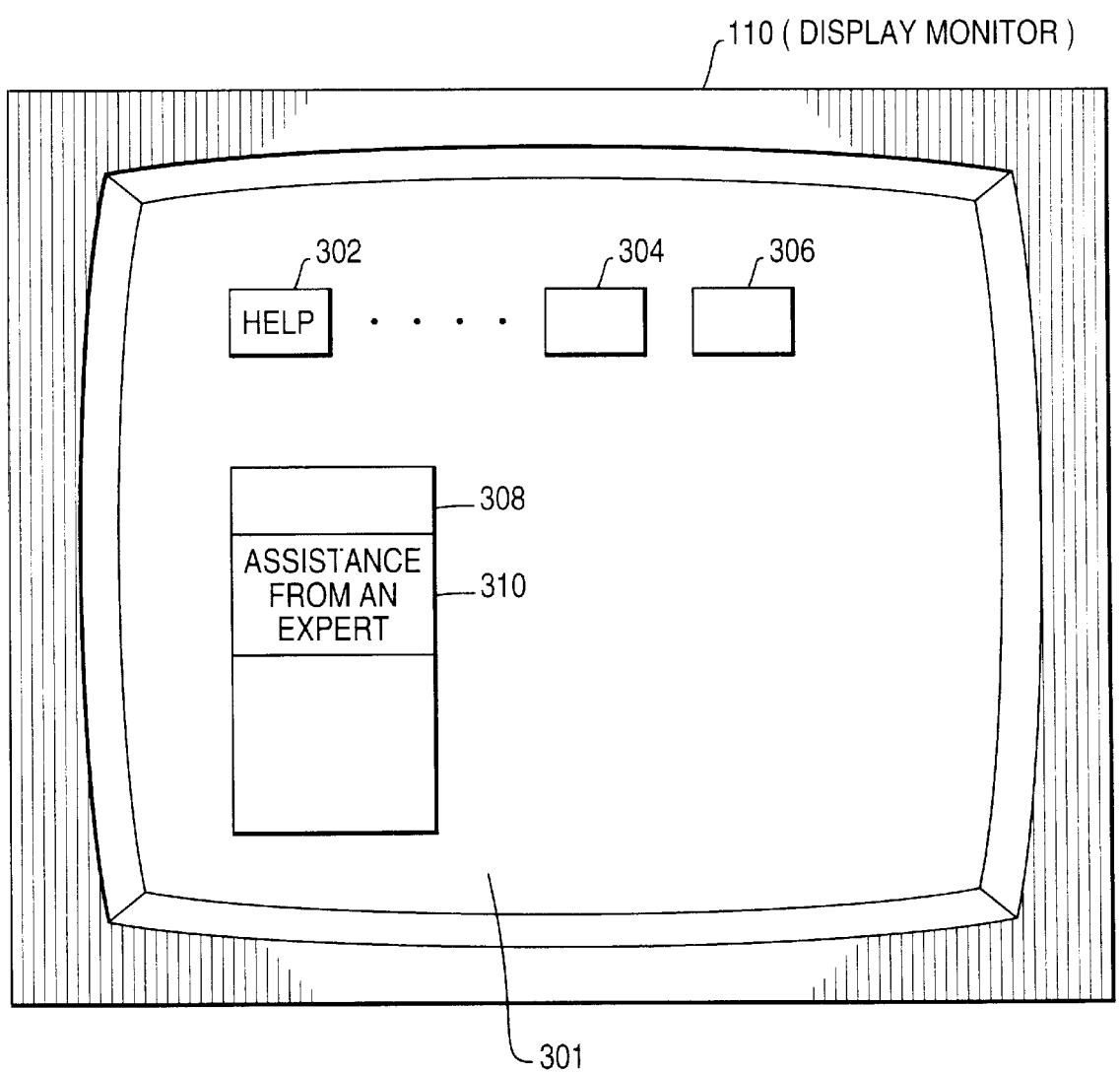
FIG. 3 shows screen layout on user's display monitor, in accordance with the present invention.

Referring to FIG. 3, there is shown screen layout on screen 301 on display monitor 110 at user side after an user enters application program 202. As shown in FIG. 3, screen 302 displays a plurality of icon boxes (302, 304 and 306). Using mouse 125, the user can click "help" box 302 to get access to manual 308. The user can then click on "assistance from an expert" box 310 if the user wants to dial an application program expert. In response to the clicking on "assistance from an expert" box 310, communication object 214 will initiate a dialing process to an application program expert for the user.

Referring to FIG. 4, there is shown a flowchart illustrating steps of interactive assistance from an application program expert, in accordance with the present invention.

In step 404, a user enters application program 202 and designates a data file to be operated by application program 202.

In step 406, information collection object 210 collects the information regarding: (1) the name and version of application software 202; and (2) the name and data structure of the data file.

In step 408, the user executes application program commands.

In step 410, information collection object 210 records the executed commands and the execution sequence. In response to each command that is being executed, collection object 210 collects changed data items (or newly created data items), if the execution of the command changes exiting data items (or creates new data items); and records the changes of the data structure if the execution of the command affects the data structure.

In step 412, the user requests assistance from an application program expert. Two methods exist for the user to request assistance. In one method, if communication objects 214 detects that the user constantly uses improper commands, it will prompt to the user on display monitor 110 whether he/she needs to call an application program expert for help. Under this method, the user provides positive answer to the prompt to indicate that assistance from an expert is needed. In the other method, the user simply clicks "assistance from an expert" box 310 on screen 301 to indicate that assistance from an expert is needed.

In step 414, responsive to the assistance request, communication object 214 fetches the name and version of application program 212 from information collection object 210; finds a dialing number from dialing directory 212 based on the name and version of application program 212; and initiates a call by dialing the number to switched network 224 via communication interface 134.

In step 415, switched network 224 connects the call to call center 225. Information transfer object 218 then sends identifications for the name and version of application program 202 to call center 225, along the path: from information transfer object 218 to communication interface 134, to switched network 224, and to call center 225. Based on the name and version identifications, call center 225 directs the call to expert side 201 and establishes a communication link between user side 200 and expert side 201.

In step 416, information transfer object 218 sends the collected information to information receiving object 226, along the path: from information transfer object 218 to communication interface 134, to switched network 224, to call center 225, to communication interface 134', and to information receiving object 226.

In step 418, display object 230 gets the collected information from information receiving object 226 and displays it on display monitor 110', so that an application program expert can have the information including: the name and version of application program 202; the name and data structure of the data file application program has operated on; records of the executed commands and the execution sequence; records of changed data items (or newly created data items), if the execution of the commands affects the exiting data items (or creates the new data items); and changes of the data structure, if the execution of the command affects the data structure of the data file.

In step 420, information receiving object 226 invokes corresponding application program 204 based on the name and version of application program 202. The computer system at expert side automatically enters the corresponding application program before the application program expert interacts with the user.

In step 422, the application program expert interacts with the user to answer the questions from, and solve the problems for, the user based on the information collected.

During the interaction between the user and expert, the voice and/or video communication signals are exchanged between communication object 214 at user side and communication object 234 at expert side, so that the user and expert can hear and/or see each other.

In assisting the user, the application program expert may run application program 204 to execute exemplary commands. Such exemplary commands and results are also displayed on display monitor 110 at user side. The expert may directly run application program 202 at user side to execute desired commands, so that the mistakes made by the user can be corrected at user side. Or the expert can simply use oral instruction to guide the user to execute desired commands to correct the mistakes he/she made, while the commands being executed and the results being generated are also displaying on display monitor 110' at expert side.

In FIG. 2, application share routines (206 and 220) and communication objects (214 and 234) can be standard software programs (such as Intel™ Proshare) commercially available to software developers.

It should be noted, from the steps above-described, that the communication link between the user and application program expert is established by communication routines. According to the present invention, the user can get assistance from a remotely located application program expert without having to learning how to use communication software.

Preferably, the software function blocks shown in FIG. 2 and the program of performing the steps shown in FIG. 4 can be stored in memory device 104 and/or hard disk 106.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

What is claimed is:

1. A method for providing assistance for an application program, comprising the steps of:
   (a) running a first instance of said application program on a first computer system used by a user;
   (b) collecting at said first computer system, information associated with said application program including an application identifier for said application program;
   (c) requesting at said first computer system assistance from a person;
   (d) establishing, based upon said application identifier of said collected information, a communication link between said first computer system used by said user and a second computer system used by said person in response to said requesting step; and
   (e) transmitting said collected information automatically to said second computer system used by said person via said communication link in response to said requesting step.

2. The method of claim 1, wherein said collecting step includes the step of collecting said information while said application program is executing.

3. The method of claim 1, further comprising the step of:
   (f) providing said assistance by said person in reference to said collected information.

4. The method of claim 1, wherein said transmitting step includes the step of executing a software routine to transmit said collected information.

5. The method of claim 1, further comprising the step of:
   invoking a second instance of said application program on said second computer system based upon said application identifier in response to said requesting step.

6. The method of claim 1, wherein:
   said running step includes the step of operating on a data file with said application program, and
   said collecting step includes the step of including in said collected information data structure of said data file.

7. The method of claim 1, wherein:
   said running step includes the step of operating on a data file by executing commands of said application program, and
   said collecting step includes the step of including in said collected information (i) said commands that have been executed, and (ii) changes that have resulted from said commands.

8. The method of claim 1, wherein said application identifier includes a name for said application program.

9. The method of claim 1, wherein said application identifier includes a name and a version for said application program.

10. A computer system for providing assistance for an application program, comprising:
    a communication interface;
    a memory having said application program and a plurality of assistance routines stored therein; and
    a processing unit coupled to said memory and operable to execute said application program and said plurality of assistance routines, said plurality of assistance routines when executed by said processing unit cause said processing unit to:
    (a) collect information associated with said application program including a data file upon which said application program is operating;
    (b) establish with said communication interface a communication link to a second computer system in response to a user requesting assistance for said application program; and
    (c) transmit said collected information automatically to said second computer system via said communication link in response to said user requesting assistance.

11. The computer system of claim 10, wherein said plurality of assistance routines when executed by said processing unit further cause said processing unit to:
    collect said information such that said collected information includes an application identifier for said application program; and
    establish said communication link based upon said application identifier.

12. The computer system of claim 10, wherein:
    said application program when executed by said processing unit further causes said processing unit to operate on a data file by executing commands of said application program, and
    said plurality of assistance routines when executed by said processing unit further cause said processing unit to collect said information such that said collected information includes said commands executed by said application program and changes that have resulted from said commands.

13. A system for providing assistance for an application program, comprising:
    a first computer system having a first communication interface, and a second computer system having a second communication interface, wherein:
    said first computer system is operable to (i) execute a first instance of said application program, (ii) collect information associated with said application program including an application identifier for said application program, (iii) establish, based upon said application identifier of said collected information, a communication link between said first communication interface and said second communication interface in response to a user requesting assistance for said application program, and (iv) transmit said collected information automatically to said second computer system via said communication link in response to said user requesting assistance, and said second computer system is operable to (i) receive said collected information from said first computer system via said communication link, and (ii) provide said assistance to said user that is generated by a person using said collected information received by said second computer system.

14. The computer system of claim 13, wherein said first computer system is further operable to:

cause a second instance of said application program to be invoked on said second computer system based upon said application identifier.

15. The computer system of claim 13, wherein said first computer system is further operable to:

operate on a data file, and collect said information such that said collected information includes a data structure of said data file.

16. The computer system of claim 13, wherein said first computer system is further operable to:

operate on a data file by executing commands of said application program, and collect said information such that said collected information includes said commands executed by said application program and changes that have resulted from said commands.

17. The system of claim 5, wherein said application identifier includes a name and a version for said application program.

18. A method for providing assistance for an application program, comprising:

(a) running a first instance of an application program on a first computer system used by a user;

(b) collecting at said first computer system, information associated with said application program including an application identifier for said application program;

(c) detecting activation of an icon displayed by said first computer system to determine a user has requested application program expert assistance;

(d) establishing a communication link between said first computer system and a second computer system in response to activating aid icon in (c);

(e) transmitting said collected information to said second computer system via said communication link;

(f) invoking automatically a second instance of said application program on said second computer system based upon said application identifier of said collected information in response to said second computer system receiving said collected information; and (g) transferring voice signals from said person to said user via said communications link, said voice signals providing said assistance and based upon said second instance of said application program and said collected information.

19. The method of claim 18, further comprising the steps of:

(h) detecting use of improper commands to determine whether said user may need assistance with said application program; and (i) displaying said icon in response to determining that said user may need assistance with said application program in (h).

20. The method of claim 18, wherein:

said running step includes the step of operating on a data file by executing commands of said application program, and said collecting step includes the step of including in said collected information (i) said commands that have been executed, and (ii) changes that have resulted from said commands.

* * * * *